United States Patent
Dudala (10) Patent No.: US 11,436,098 B2
(45) Date of Patent: Sep. 6, 2022

(54) CRASH RECOVERY OF VRPA CLUSTER PROTECTION ENGINE

(71) Applicant: EMC IP Holding Company LLC, Hopkinton, MA (US)

(72) Inventor: Kiran Kumar Dudala, Irvine, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 848 days.

(21) Appl. No.: 16/053,646

(22) Filed: Aug. 2, 2018

(65) Prior Publication Data

US 2020/0042405 A1   Feb. 6, 2020

(51) Int. Cl.
*G06F 11/14* (2006.01)
*G06F 16/23* (2019.01)

(52) U.S. Cl.
CPC ...... *G06F 11/1469* (2013.01); *G06F 11/1474* (2013.01); *G06F 16/2365* (2019.01); *G06F 2201/84* (2013.01)

(58) Field of Classification Search
CPC ............. G06F 11/1469; G06F 16/2365; G06F 11/1474; G06F 2201/84
See application file for complete search history.

(56) References Cited

U.S. PATENT DOCUMENTS

| | | | | |
|---|---|---|---|---|
| 8,892,689 | B1 * | 11/2014 | Mowry | H04L 45/26 709/219 |
| 2002/0007468 | A1 * | 1/2002 | Kampe | H04L 43/00 714/4.12 |
| 2004/0059805 | A1 * | 3/2004 | Dinker | G06F 11/2069 709/223 |
| 2010/0306572 | A1 * | 12/2010 | Salvarani | H04L 63/164 714/4.1 |
| 2013/0138903 | A1 * | 5/2013 | Matsui | G06F 3/065 711/162 |
| 2016/0182284 | A1 * | 6/2016 | Ayanam | H04L 41/0806 709/222 |
| 2017/0093623 | A1 * | 3/2017 | Zheng | H04L 67/141 |
| 2017/0206238 | A1 * | 7/2017 | Coutinho | G06F 16/215 |
| 2017/0235507 | A1 * | 8/2017 | Sinha | G06F 3/0683 711/114 |
| 2018/0316749 | A1 * | 11/2018 | Sah | G06F 9/5083 |
| 2019/0097900 | A1 * | 3/2019 | Rodriguez | H04L 41/5054 |
| 2020/0034167 | A1 * | 1/2020 | Parthasarathy | G06F 9/45558 |

OTHER PUBLICATIONS

Bose, Michael. Protect Your Entire System Configuration with Self-Backup. Jun. 11, 2018. https://www.nakivo.com/blog/protect-your-entire-system-configuration-with-self-backup/ (Year: 2018).*

* cited by examiner

*Primary Examiner* — Alicia M Willoughby
(74) *Attorney, Agent, or Firm* — Workman Nydegger (57) ABSTRACT

One example method includes, in response to a crash event, obtaining data protection system credentials, accessing a target storage of the data protection system, obtaining, from the target storage, a configuration file including configuration information for a data protection cluster, and using, by the data protection cluster, the configuration information to self-configure. The method further includes creating a consistency group (CG) of a group of volume, and restoring a journal volume to append backup indexes.

16 Claims, 5 Drawing Sheets

CRASH RECOVERY OF VRPA CLUSTER PROTECTION ENGINE

FIELD OF THE INVENTION

Embodiments of the present invention generally relate to data protection. More particularly, at least some embodiments of the invention relate to systems, hardware, software, computer-readable media, and methods directed to various processes for automatic crash recovery of a virtual cluster protection system. The automatic crash recovery is enabled by the encoding of configuration information into target storage so that the virtual cluster protection system can discover its own configuration, self-configure based on the configuration information, and then bring itself back online, all without manual intervention.

BACKGROUND

Many protection and recovery efforts in data protection systems have focused on protection and restoration of the data in the event that a crash or other problem occurs. However, less attention has been paid to dealing with the effects of a crash on the configuration of the data protection system. Thus, conventional systems and methods are not well suited for reconfiguring a data protection system after the data protection system has experienced a crash or other problem.

Moreover, reconfiguration of a data protection system presents some significant challenges. In the case of a data protection cluster, for example, the data protection cluster may include a large number of nodes, and each of the nodes may be respectively associated with one or more virtual Local Area Networks (VLANs). As well, each of the nodes may include backups of one or more virtual machines (VMs). Thus, in order to be able to restore the data protection cluster, information is needed concerning each of the nodes, VLANs, and backups. Such information may include, for example, node deployment information, required hostname, management/data IPs and VLANs for all nodes, cluster name, IP and VLAN for all data protection clusters, repository volume, mirror volume, number of data protection clusters, number of nodes per data protection cluster, and total number of consistency groups created. Further, detailed information may be needed concerning the consistency groups, such as consistency group ID, storage unit name, vDisk pool name and device-group name under the data protection system, journal volume details, and the identity of a preferred data protection node.

As should be apparent, it can be quite difficult to track and retain all of this configuration information. Reliable tracking and retention of this information becomes even more difficult with relatively large cluster environments. Further, tracking and retention of this information, when performed at all, is typically achieved with manual processes which are prone to error.

One potential approach to avoid the problems associated with a crash would be to provision additional nodes and clusters spread across multiple locations. In effect, this approach would increase redundancy and thus provide an additional measure of protection. However, this approach would introduce further complexity, and expenses. As well, this approach would still fail to directly address the problem of having to reconfigure systems and devices after a crash.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection. More particularly, at least some embodiments of the invention relate to systems, hardware, software, computer-readable media, and methods directed to various processes for automatic crash recovery of a virtual cluster protection system. The automatic crash recovery is enabled by the encoding of configuration information into target storage so that the virtual cluster protection system can discover its own configuration, self-configure based on the configuration information, and then bring itself back online, all without manual intervention.

In general, embodiments of the invention can be employed in connection with a cluster protection system, which may also be referred to herein as comprising or consisting of a cluster protection engine. One example of such a cluster protection system is the Dell-EMC virtual RecoveryPoint Appliance (vRPA) cluster protection system (CPS). However, the scope of the invention is not limited to this example cluster protection system. In fact, the scope of the invention extends beyond cluster protection systems, and broadly embraces automatic recovery of any system configuration after a crash involving that system. By way of example, embodiments of the invention may be employed in connection with the Dell-EMC vSphere Application Program Interface (API) for input/output operations (IO) filtering, collectively VAIO. In brief, VAIO enables a VM to have its IOs safely and securely filtered in accordance with a policy. Particularly, embodiments of the invention can be employed to recover and configure a VAIO filter by storing details in the target storage system.

In the illustrative, but non-limiting, case of a vRPA cluster protection system, embodiments of the invention embrace methods to encode the cluster configuration information into the target storage such that any newly created vRPA cluster protection system can be pointed to a target storage which would then allow the vRPA cluster protection system to discover its own configuration and allow the vRPA cluster protection system to self-configure itself and get itself working without any manual intervention. More particularly, the disclosed automated recovery procedure allows a vRPA cluster to get up and running with proper IPs using correct repository volumes such that: (i) all vRPA nodes are properly recovered with all correct configuration; and (ii) all consistency groups (CG) are restored with the correct journal details.

In operation, a vRPA may be manually configured at the time of its initial creation. The configuration information for the vRPA is then stored in a file created on the target storage, that is, the backend storage where backups associated with the vRPA are stored. As well, the vRPA further protects the Repository volume which contains all cluster failover details, and the vRPA also captures consistency group (CG) names and IDs structure inside the file that includes the vRPA configuration information, and saves that information. Further, the vRPA protects the journal volume details so as to track the protection details of each virtual machine (VM), and saves that information as a VMDK file.

When recovering after a crash, the vRPA gets the data protection system credentials during the vRPA node deployment through an open virtual appliance (ova), that is, a pre-configured virtual machine image that is ready to run on a hypervisor. Next, the vRPA identifies its own IP address and connects to the data protection system whose credentials were previously obtained. The vRPA then locates the configuration file listing its IP address. Upon identifying the configuration file, the vRPA then obtains information from the configuration file, such as its own cluster name, credentials, its own cluster ID, each vRPA node IP address, the name of each node, and network details of each node.

With this information, the vRPA can now automatically self-configure since it has all the information required for its configuration. Next, the vRPA can join the cluster and is now fully operational. Finally, the vRPA cluster can then create CGs with same exact IDs and names from the configuration file, and restore the journal volume to append the backup indexes.

Advantageously then, embodiments of the invention may provide various benefits relative to conventional systems and methods. To illustrate, embodiments of the invention may enable a virtual cluster protection system to, among other things, automatically: (i) discover its own configuration; (ii) self-configure based on the configuration information; and, (iii) bring itself back online, all without manual intervention.

As the foregoing examples illustrate, embodiments of the invention may improve the operation of a computing system, or element of a computing system, such as by providing for crash recovery of a cluster protection system. As well, embodiments of the invention provide improved protection by using configuration information to directly address the problem of crashes. Further, because the crash recovery processes are implemented automatically, the possibility of the introduction of human error in the crash recovery process is reduced, or eliminated. Aspects of the disclosed processes and methods are discussed below in connection with various illustrative examples.

A. Aspects of an Example Operating Environment

The following is a discussion of aspects of example operating environments for various embodiments of the invention. This discussion is not intended to limit the scope of the invention, or the applicability of the embodiments, in any way.

At least some embodiments may be employed in connection with a data protection environment, such as the Dell-EMC DataDomain environment, which can implement backup, archive, and/or disaster recovery, functions. However, the scope of the invention is not limited to this example data protection environment.

The data protection environment may take the form of a cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

Figure 1:
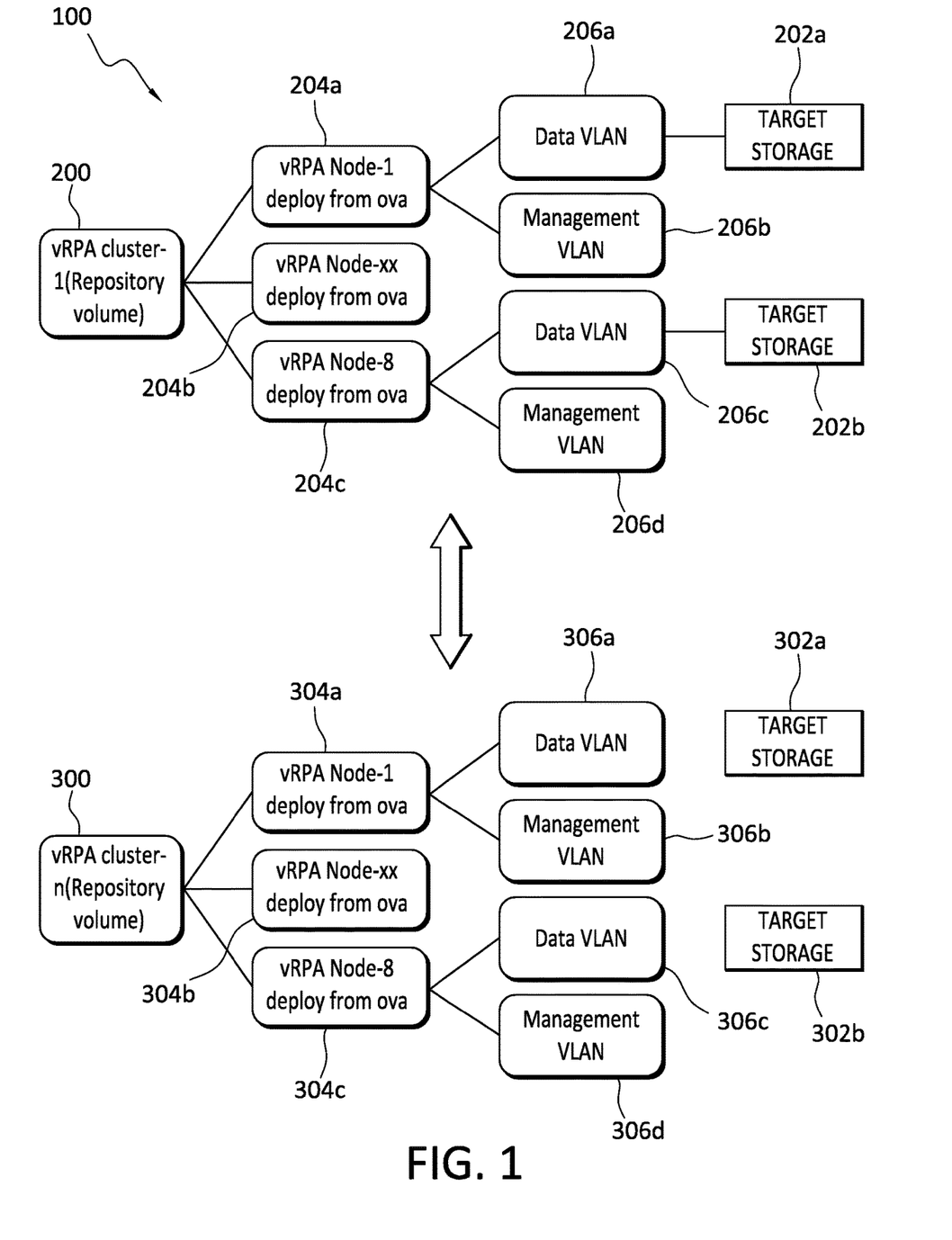
FIG. 1 discloses aspects of an example operating environment for some embodiments of the invention.

With particular reference now to FIG. 1, an example operating environment 100 may include 1 . . . n data protection clusters (DPC), such as cluster 200 and cluster 300. One, some, or all, of the clusters may be a Dell-EMC virtual RecoveryPoint Appliance (vRPA) cluster protection system (CPS). In brief, the vRPA may perform continuous local and/or remote replication of production data generated by one or more applications running on host devices (not shown). It should be noted that the scope of the invention is not limited to the use of vRPA clusters and, more broadly extends to any other data protection cluster with which the crash recovery functionality disclosed herein would be useful. Accordingly, clusters such as the vRPA are referred to more generally herein as data protection clusters (DPC).

Each of the clusters 200 and 300 may comprise, or otherwise be associated with, a repository volume. As used herein, a repository volume refers to a volume which is dedicated on Storage Area Network (SAN)—attached storage for each cluster 200 and 300. The target storage 202a, 202b, 302a and/or 302b, for example, may comprise SAN-attached storage. In general, the repository volume stores configuration information about the DPCs and Consistency Groups (CG), discussed below.

As further indicated in FIG. 1, each DPC 200 and 300 may comprise a plurality of respective nodes, such as nodes 204a . . . 204c, and 304a . . . 304c, for example. Some example DPCs include 8 or 10 nodes, but no particular number of nodes is required for a DPC. In the case where the DPC is a vRPA, one, some, or all, of the nodes 204a . . . 204c and 304a . . . 304c may be a vRPA node. The nodes 204a . . . 204c and 304a . . . 304c may each be created and deployed through the use of an OVA file, that is, a virtual appliance used by virtualization applications such as VMware Workstation and Oracle VM Virtualbox. In general, the OVA file is a package that contains files used to describe a virtual machine (VM) that will constitute the node.

With continued reference to FIG. 1, each of the clusters 200 and 300 may include, or otherwise be associated with, one or more Data VLANs and Management VLANs. In the example illustrated configuration, one or more of the nodes 204x and 304x may communicate with one or both of a Data VLAN and a Management VLAN. In particular, node 204a is configured to communicate with Data VLAN 206a and Management VLAN 206b. The Data VLAN 206a is configured to carry user-generated traffic and may comprise, or consist of, target storage 202a. More particularly, the Data VLAN 206a is used to send data from one or more nodes, such as node 204a for example, to target storage. Thus, the target storage 202a may store backups of production data generated by user applications at one or more of the nodes, such as at node 204a. The management VLAN 206b may be used to configure the access management capabilities of a switch. With respect to node 204c, the Data VLAN 206c, target storage 202b, and Management VLAN 206d may be configured and/or operate similarly, or identically, to the Data VLAN 206a, target storage 202a, and Management VLAN 206b, respectively. As shown in FIG. 1, not every node needs communication with a Data VLAN and/or Management VLAN. This is illustrated with respect to node 204b.

The foregoing discussion of DPC 200 and its constituent and associated elements, applies as well to DPC 300. Particularly, with respect to nodes 304a and 304c, the Data VLAN 306a/c, target storage 302a/b, and Management VLAN 306b/d may, but need not necessarily, be configured and/or operate similarly, or identically, to the Data VLAN 206a, target storage 202a, and Management VLAN 206b, respectively. Node 304b may be similar, or identical, to node 204b, in terms of its configuration and/or operation, although that is not required.

As will be apparent from the present disclosure, including the example of FIG. 1, a variety of information may be employed to configure a new, and/or recover, a DPC such as a vRPA cluster. In the example case of a vRPA cluster, such information includes, but is not necessarily limited to: vRPA node deployment from OVA; required hostname, management/data IPs and VLANs for all nodes; cluster name, IP and VLAN for all vRPA clusters; repository volume; mirror volume; number of vRPA clusters; number of nodes per cluster; total number of Consistency Groups created; and the preferred node details for each Consistency Group.

Figure 2:
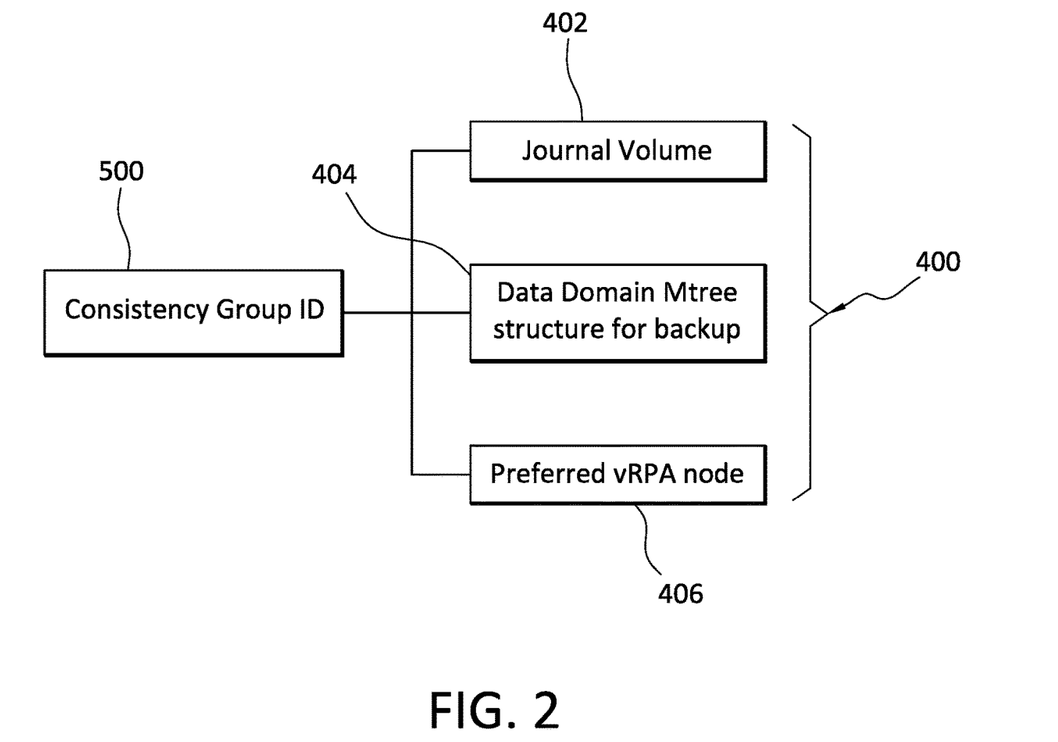
FIG. 2 discloses aspects of an example VM.

With continued attention to FIG. 1, and directing attention now to FIG. 2, details are provided concerning an example Virtual Machine (VM) 400 that may form part, or all, of a node, such as any of nodes 204a . . . 204c, and nodes 304a . . . 304c. As indicated, the VM 400 may be an element of a Consistency Group (CG) 500. While not specifically indicated in FIG. 2, the CG 500 may include multiple VMs. In general, the VM 400 may include a journal volume 402, an Mtree data structure 404 for backup of node data, and may identify a preferred node 406. The journal volume 402 holds snapshots of data that are to be replicated, such as to target storage for example.

It should be noted that as used herein, a Consistency Group (CG) refers to a group to which a plurality of volumes, such as VMs for example, are assigned. By assigning volumes to a CG, assurance can be had that snapshots, or other data protection processes, of all volumes in the CG are taken at the same time. In this way, crash-consistent copies of a collection of volumes at a particular point in time can be obtained.

As will be apparent from the present disclosure, including the example of FIG. 2, a variety of information may be employed to keep track of each CG per protected VM. In the example case of a vRPA cluster, such information includes, but is not necessarily limited to: Consistency Group ID; Storage Unit name, vDisk Pool name and device-group name under Data Domain; Journal Volume details; and, Preferred vRPA node.

B. DPC Configuration Information

With continued attention to FIGS. 1 and 2, there are various ways that the DPC and VM information may be obtained. Below is an illustrative example that involves a vRPA cluster. Analogous commands may be employed for other types of DPCs.

In order to obtain the vRPA cluster details, the following commands can be run on any vRPA node, such as the nodes 204a . . . 204c, or 304a . . . 304c.

```
Setup --- View Settings:
  ** Main Menu **
    [1] Installation
    [2] Setup
    [3] Diagnostics
    [4] Cluster operations
    [5] Shutdown / Reboot operations
    [Q] Quit
    vm-qa-0142 RPA 2: 2
  ** Setup **
    [1] Modify settings
    [2] Configure repository volume
    [3] Get remote settings
    [4] Retrieve previous settings
    [5] Apply settings
    [6] View settings
    [7] Reset settings changes
    [8] Advanced options
    [9] Console configuration
    [M] Main Menu
    [B] Back
    [Q] Quit
    vm-qa-0142 RPA 2: 6
  ** View settings **
    [1] View cluster vm-qa-0142 settings
    [M] Main Menu
    [B] Back
    [Q] Quit
    vm-qa-0142 RPA 2: 1
|--------------------------------------------------|
| Cluster vm-qa-0142                               |
|--------------------------------------------------|
| Internal cluster name        | 0x7763a6eb7b4c1610 |
```

-continued

```
| Product Type              | RP_4_VM        |
| Cluster management (LAN) IPv4 | 10.25.11.152 |
| Cluster management (LAN) IPv6 | N/A         |
| DATA IPV4 netmask         | 255.255.255.0  |
| WAN LAN IPV4 netmask      | 255.255.255.0  |
| Time zone                 | America/Dawson |
| Primary DNS server        | 10.6.254.4     |
| Secondary DNS server      | N/A            |
| Primary NTP server        | 10.254.140.21  |
| Secondary NTP servers     | N/A            |
| Local domain              | N/A            |
| Number of Virtual Ports   | 1              |
|                           |                |
| RPA 1                     |                |
| RPA Nic Topology          | data is separated |
|RPA LAN IPv4               | 10.25.11.150   |
|   RPA LAN IPv6            | N/A            |
|   RPA WAN IP              | 10.25.11.150   |
|   RPA DATA1 IP            | 10.25.11.153   |
|   RPA DATA2 IP            | 10.25.11.153   |
| RPA 2 |                   |                |
| RPA Nic Topology          | data is separated |
|   RPA LAN IPv4            | 10.25.11.151   |
|   RPA LAN IPv6            | N/A            |
|   RPA WAN IP              | 10.25.11.151   |
|   RPA DATA1 IP            | 10.25.11.157   |
|   RPA DATA2 IP            | 10.25.11.157   |
|---------------------------|----------------|
|-------------------------------------------- |
| Gateway       | Target netmask | Target subnet |
|---------------|----------------|---------------|
| 10.25.11.1 (default) | 0.0.0.0 | default    |
|---------------|----------------|---------------|
|-------------------- |
| RPA Ports     |
|-------------------- |
| RPA 2 | 3260  |
| RPA 1 | 3260  |
|-----------|---------|
```

With continued attention to FIGS. 1 and 2, there are various ways that the DPC and VM information may be obtained. Below is an illustrative example that involves a CG.

In order to get the CG details, the following vRPA APIs can be used. Analogous APIs may be used for other CGs that are not specifically associated with the DataDomain environment.

GET/fapi/rest/5_0/groups/GET
GET/fapi/rest/5_0/groups/1702135399/settings

C. Example Host and Server Configurations

Figure 3:
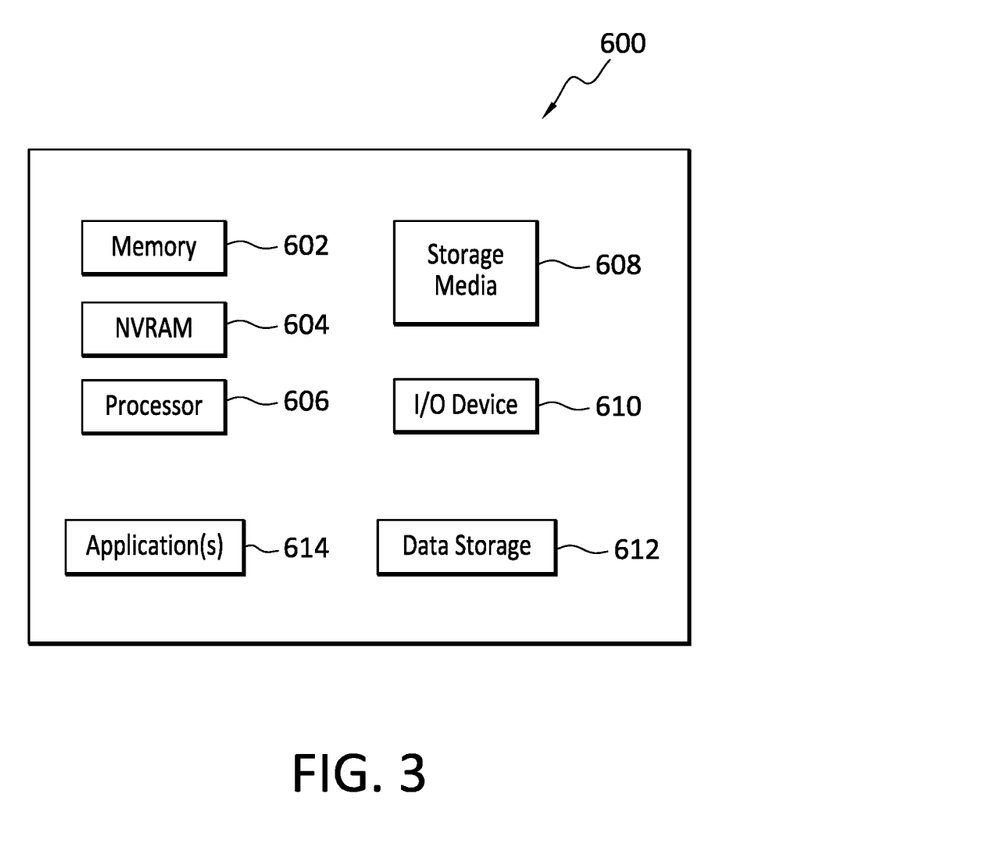
FIG. 3 discloses aspects of an example host configuration.

With reference briefly now to FIG. 3, any one or more of the DPC, nodes, VMs, Data VLAN, Management VLAN, or target storage, may comprise, consist of, or be implemented as, a physical computing device, one example of which is denoted at 600. As well, where any of the aforementioned elements comprise or consist of a VM, that VM may constitute a virtualization of any combination of the physical components disclosed in FIG. 3.

In the example of FIG. 3, the physical computing device 600 includes a memory 602 which can include one, some, or all, of random access memory (RAM), non-volatile random access memory (NVRAM) 604, read-only memory (ROM), and persistent memory, one or more hardware processors 606, non-transitory storage media 608, 10 device 610, and data storage 612. One or more of the memory components 602 of the physical computing device can take the form of solid state device (SSD) storage. As well, one or more applications 614 are provided that comprise executable instructions. Such executable instructions can take various forms including, for example, executable instructions for performing any combination of one or more of the following processes: initially configuring a DPC such as a vRPA cluster protection engine; creating and storing a configuration file that includes cluster configuration information; searching for, and retrieving, a configuration file that includes cluster configuration information; using cluster configuration information to self-configure a cluster after a crash has occurred; creating one or more CGs with the same IDs and names as contained in a previously created configuration file; restoring a journal volume to append backup indexes; restoring a backup along with self-configuring of a cluster; and, updating a configuration file to reflect changes in a cluster configuration.

D. Aspects of Example Methods

Figure 4:
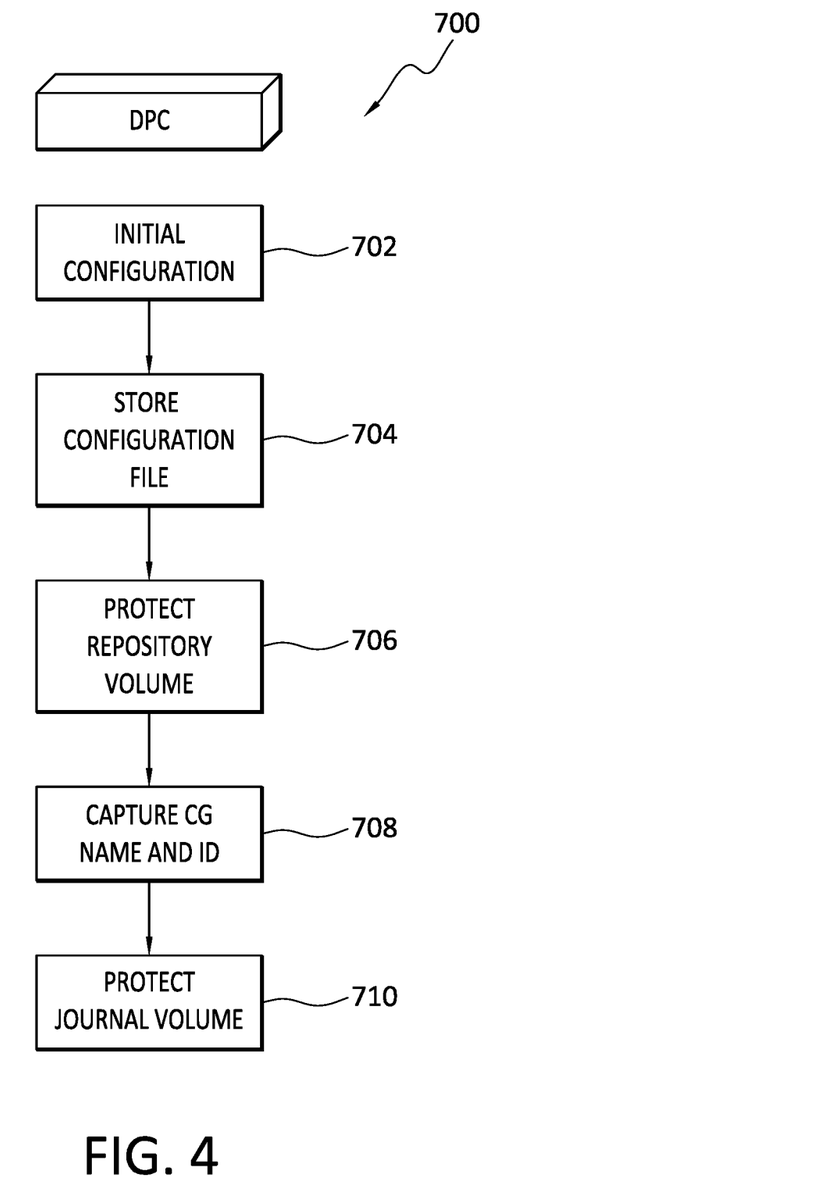
FIG. 4 is a flow diagram that discloses aspects of an example configuration method in accordance with various embodiments of the invention.
Figure 5:
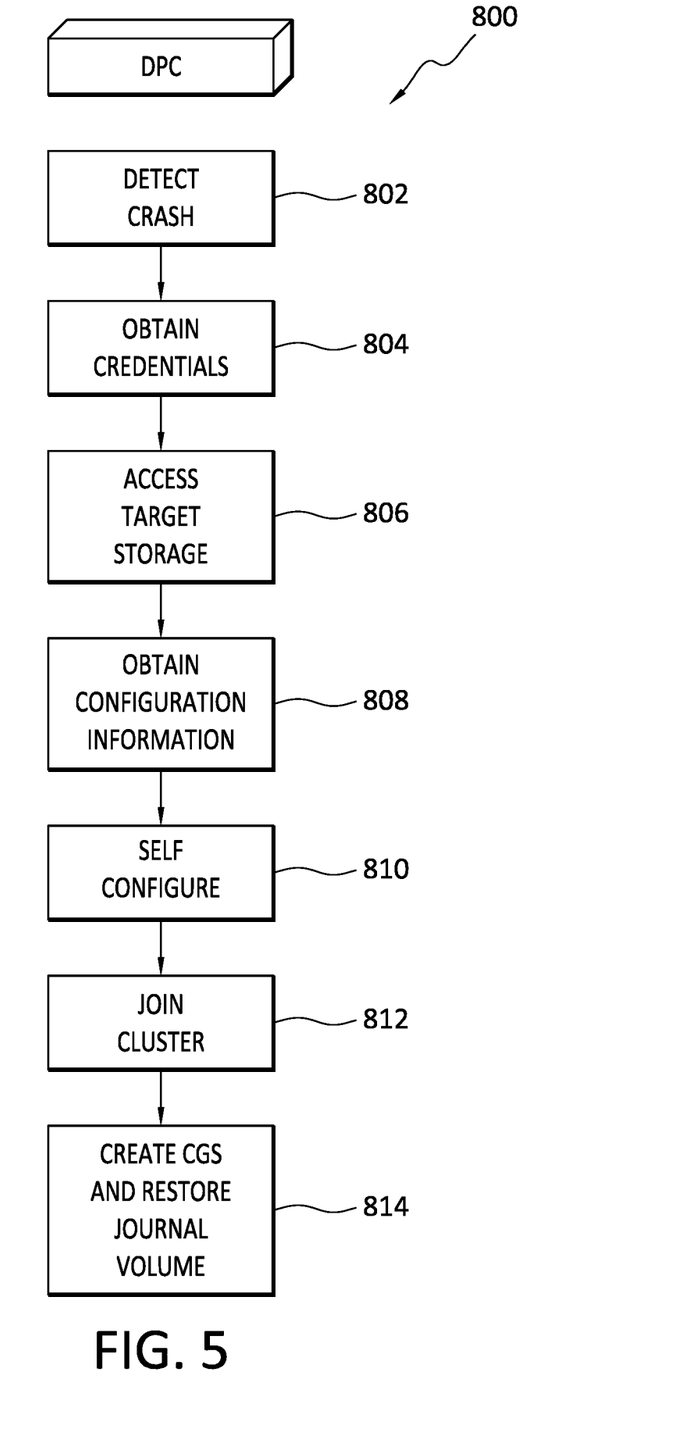
FIG. 5 is a flow diagram that discloses aspects of an example crash recovery method in accordance with various embodiments of the invention.

With attention now to FIGS. 4 and 5, details are provided for some example methods for initial configuration of a DPC, such as a vRPA for example, and for recovery of a DPC, such as a vRPA for example, after a crash.

Turning first to FIG. 4, methods for identifying and preserving DPC configuration information are disclosed, one example of which is denoted at 700. At the time of its initial creation, the DPC may be manually configured 702. The initial configuration 702 may involve a number of processes, as discussed hereafter.

In the example case of a vRPA, a vDiskPool, that is, a pool of virtual disks for data storage, is created inside DataDomain in order to keep track of vRPA cluster configuration. That is, the virtual disks in the vDiskPool can be used to access configuration data residing in target storage. Thus, the vDiskPool name can be unique to enable it to be easily identified. This may be useful when a crash has occurred and the DPC needs to self-configure using the stored configuration information. An example of a command to create a vDiskPool is: vdisk pool create name dellemc-vRPACluster-name user sysadmin.

In addition to creation of the vDiskPool, the initial configuration 702 may also involve using a connection consistent with the Secure Shell (SSH) protocol to connect to one of the vRPAs, using RecoverPoint or boxmgmt credentials. A further process that may be part of the initial configuration 702 is exportation of the vRPA cluster settings to a configuration file, such as file1.yml.

After the initial configuration 702 is performed, the configuration file is stored 704 in the target storage, that is, the storage where backups of node data are stored. Thus, in some embodiments at least, the file1.yml is stored in the same Mtree that was created to store backups resulting from the vRPA cluster that the vRPA node belongs to. In one example implementation, this Mtree is named "dellemc-vRPACluster-name" on the Data Domain.

At 706, the vRPA protects, such as by backing up, the repository volume. The repository volume contains all cluster failover details. The cluster failover details of the repository volume may be stored in the same Mtree as the configuration file fil1.yml, that is, the Mtree "dellemc-vRPACluster-name." At 708, the vRPA captures CG names and IDs, including their DataDomain Mtree structure, inside a file file2.yml and saves the file in the Mtree "dellemc-vRPACluster-name." Finally, at 710, the vRPA protects the journal volume details to track the protection details of each VM, and the vRPA saves the VM protection details as a VMDK file inside the Mtree "dellemc-vRPACluster-name."

At this point, the vRPA has been configured, and the vRPA configuration details stored in target storage. Thus, in the event of a crash, the vRPA can automatically: (i) discover its own configuration; (ii) self-configure based on the configuration information; and, (iii) bring itself back online, all without manual intervention. If the vRPA configuration should change prior to a crash, a new configuration file can be created to establish a new restore point, or the existing configuration can be modified to reflect the changes to the vRPA configuration.

It should be noted that in some embodiments at least, the configuration file fil1.yml includes backup dataset details, such as the name, ID, location, and type, of the VM backups. In this way, after a crash, the backups can be restored along with the self-configuration of the vRPA. The CG helps to ensure that the VM backups are in a consistent state at the time of the crash. Thus, when the vRPA recovers after the crash, the VM backups match up with the restored vRPA configuration.

With attention now to FIG. 5, methods for crash recovery of a DPC are disclosed, one example of which is denoted at 800. The DPC, one example of which is a vRPA, may be initially configured using the method of FIG. 4.

At some point, a crash of the vRPA may occur. The vRPA can detect 802 its crash, and begin to implement a crash recovery process. As part of the crash recovery process, the vRPA obtains 804 its DataDomain access credentials that were created during the initial vRPA node deployment through OVA. The vRPA can then identify its own IP address, and connect 806 to DataDomain with its credentials.

After the vRPA has connected 806 to DataDomain, the vRPA then iterates through all .yaml files in all Mtrees on the DataDomain until it locates and obtains 808 the .yaml file listing the IP address of the vRPA. Upon identifying the matching .yaml file, the vRPA identifies from the .yaml file, such as the file1.yml for example, its own cluster name, vCenter credentials, its own cluster ID, each vRPA node IP, name of each node, and the network details of each node. With this configuration information, the vRPA then configures itself 810. Once configured, the vRPA can then join the cluster 812 and is now fully operational.

Finally, the vRPA then creates CGs 814 with same IDs and names as were initially stored in the configuration file file2.yml and restores 814 the journal volume to append the backup indexes. In this way, the vRPA is able to restore the VM backups as well as its own configuration. Among other things then, the automated vRPA recovery procedure allows a vRPA cluster to get itself up and running with proper IPs using correct repository volume such that: (i) all vRPA nodes are properly recovered with all correct configuration; and (ii) all CGs are restored with correct journal details.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    performing, by a data protection cluster that includes a plurality of nodes, a self-recovery process, and the self-recovery process comprises:
    detecting, by the data protection cluster, a crash of the data protection cluster, and in response to the detecting, obtaining, by the data protection cluster, data protection system credentials that were created during an initial data protection cluster node deployment;

after obtaining the data protection system credentials, using, by the data protection cluster, the data protection system credentials to access a target storage of the data protection system;

based on an IP address of the data protection cluster, obtaining, by the data protection cluster from the target storage, a configuration file that includes configuration information about a configuration of the data protection cluster;

using, by the data protection cluster, the configuration information to self-configure the data protection cluster so that, once self-configured, the data protection cluster is restored from a crashed state to a fully operational state, and the configuration information used by the data protection cluster to self-configure itself comprises an IP (Internet Protocol) address of the data protection cluster, a cluster name of the data protection cluster, and a cluster ID of the data protection cluster;

creating, by the data protection cluster, a consistency group (CG) of a plurality of volumes; and restoring, by the data protection cluster, a journal volume to append backup indexes.

2. The method as recited in claim 1, wherein backups of data from one or more nodes of the data protection cluster reside in the target storage.

3. The method as recited in claim 1, wherein the plurality of volumes in the CG are crash-consistent copies.

4. The method as recited in claim 1, wherein obtaining the configuration information comprises iterating through a plurality of configuration files that reside in the target storage and selecting a configuration file that includes an Internet Protocol (IP) address that matches an IP address of the data protection cluster.

5. The method as recited in claim 1, wherein the volumes in the CG each correspond to a respective virtual machine (VM) backup that resides in the target storage, and the VM backups are in a consistent state at the time of the crash.

6. The method as recited in claim 1, wherein the method is performed automatically upon detection of the crash event.

7. The method as recited in claim 1, wherein creating a consistency group (CG) of a plurality of volumes comprises retrieving a CG name and CG ID from another configuration file.

8. The method as recited in claim 1, wherein the configuration file and backups of data from one or more nodes of the data protection cluster are stored in the same Mtree.

9. A non-transitory storage medium having stored therein computer-executable instructions which, when executed by one or more hardware processors, perform the following operations:

performing, by a data protection cluster that includes a plurality of nodes, a self-recovery process, and the self-recovery process comprises:

detecting, by the data protection cluster, a crash of the data protection cluster, and in response to the detecting, obtaining, by the data protection cluster, data protection system credentials that were created during an initial data protection cluster node deployment;

after obtaining the data protection system credentials, using, by the data protection cluster, the data protection system credentials to access a target storage of the data protection system;

based on an IP address of the data protection cluster, obtaining, by the data protection cluster from the target storage, a configuration file that includes configuration information about a configuration of the data protection cluster;

using, by the data protection cluster, the configuration information to self-configure itself the data protection cluster so that, once self-configured, the data protection cluster is restored from a crashed state to a fully operational state, and the configuration information used by the data protection cluster to self-configure itself comprises an IP (Internet Protocol) address of the data protection cluster, a cluster name of the data protection cluster, and a cluster ID of the data protection cluster;

creating, by the data protection cluster, a consistency group (CG) of a plurality of volumes; and restoring, by the data protection cluster, a journal volume to append backup indexes.

10. The non-transitory storage medium as recited in claim 9, wherein backups of data from one or more nodes of the data protection cluster reside in the target storage.

11. The non-transitory storage medium as recited in claim 9, wherein the plurality of volumes in the CG are crash-consistent copies.

12. The non-transitory storage medium as recited in claim 9, wherein obtaining the configuration information comprises iterating through a plurality of configuration files that reside in the target storage and selecting a configuration file that includes an Internet Protocol (IP) address that matches an IP address of the data protection cluster.

13. The non-transitory storage medium as recited in claim 9, wherein the volumes in the CG each correspond to a respective virtual machine (VM) backup that resides in the target storage, and the VM backups are in a consistent state at the time of the crash.

14. The non-transitory storage medium as recited in claim 9, wherein the method is performed automatically upon detection of the crash event.

15. The non-transitory storage medium as recited in claim 9, wherein creating a consistency group (CG) of a plurality of volumes comprises retrieving a CG name and CG ID from another configuration file.

16. The non-transitory storage medium as recited in claim 9, wherein the configuration file and backups of data from one or more nodes of the data protection cluster are stored in the same Mtree.

* * * * *